United States Patent [19]

Sterling et al.

[11] Patent Number: 5,047,919
[45] Date of Patent: Sep. 10, 1991

[54] METHOD AND APPARATUS FOR MONITORING SOFTWARE EXECUTION IN A PARALLEL MULTIPROCESSOR COMPUTER SYSTEM

[75] Inventors: Thomas L. Sterling, Crofton, Md.; Donald J. Becker, Palm Bay, Fla.

[73] Assignee: Harris Corporation, Melbourne, Fla.

[21] Appl. No.: 382,063

[22] Filed: Jul. 14, 1989

Related U.S. Application Data

[63] Continuation-in-part of Ser. No. 848,013, Apr. 3, 1986, abandoned.

[51] Int. Cl.⁵ .......................................... G06F 11/30
[52] U.S. Cl. ............................ 364/200; 364/264.4; 364/264.5
[58] Field of Search ... 364/200 MS File, 900 MS File

[56] References Cited

U.S. PATENT DOCUMENTS

| | | | |
|---|---|---|---|
| 4,034,353 | 7/1977 | Denny et al. | 364/200 |
| 4,124,795 | 10/1978 | Dean | 364/200 |
| 4,231,106 | 10/1980 | Heap et al. | 364/900 |
| 4,432,051 | 2/1984 | Bogaert et al. | 364/200 |
| 4,601,008 | 1/1986 | Kato | 364/900 |
| 4,638,427 | 1/1987 | Martin | 364/200 |
| 4,845,615 | 7/1989 | Blasciak | 364/200 |

OTHER PUBLICATIONS

"Scheduling in a General Purpose Operating System" by Abell et al., *AFIPS Conference Proceedings*, vol. 37, 1970, Nov. 17–19, 1970, pp. 89–96.

"Gprof: A Call Graph Execution Profiler" by Graham Kessler and McKusick, Journal SIGLAN, Jun. 1982, pp. 120–126.

UNIX Programmer's Manual, "Prof Command", Section 1, published by Bell Laboratories, Murray Hill, N.J.

*Primary Examiner*—Lawrence E. Anderson
*Attorney, Agent, or Firm*—John L. DeAngelis, Jr.

[57] ABSTRACT

A software monitor for analyzing the running of a software program. The software monitor is a hardware device including registers and control devices that interacts with the software program running on the monitored computer or multi-processor. Through commands placed in the running software, the software monitor is able to monitor various parameters related to the running of the software program. These parameters include the number of times each segment of the program has been entered, the number of times an interrupt was received during the running of each segment, and the total time spent by the program in each segment.

15 Claims, 8 Drawing Sheets

METHOD AND APPARATUS FOR MONITORING SOFTWARE EXECUTION IN A PARALLEL MULTIPROCESSOR COMPUTER SYSTEM

This is a continuation-in-part of co-pending application Ser. No. 06/848,013 filed on Apr. 3, 1986, now abandoned.

FIELD OF THE INVENTION

This invention relates to a method and apparatus for monitoring software to determine the frequency of use, time of use, and other factors for portions or segments of the computer software.

BACKGROUND OF THE INVENTION

In many computer systems, especially those of a multiprocessor architecture, it is important to determine how much time the operating system spends in various portions of the software code. This is especially true where there is contention for physical resources, such as communications bandwidth and memory, and where there is contention for objects such as code, data, and control. The ability to segmentize the software code and to determine for how long and the number of times each segment is utilized are important factors in designing multiprocessor architecture and software support.

Prior art techniques for obtaining this software utilization information include stochastic measurements derived from profiling methods. One profile method is to check the computer's program counter every 16.7 ms (i.e., once every cycle at the 60 Hz power line frequency) to indicate which portion of the computer software is running at that instant. The results of this program counter check can be assembled to develop a profile of timing information for the program segments. Hardware logic analyzers can also be used to check the logic state of control lines or buses within the computer to determine the currently-running statements or segments of the program. Some computer systems also provide a visual indication when certain peripheral devices are accessed by the central-processing unit. Although these prior art techniques provide limited information concerning the operating time of a software program, they do not provide the substantial amount of deterministic information that can be gained using the present invention, and that is necessary to refine the software code to decrease run-time and avoid access contention problems in parallel architectures.

SUMMARY OF THE INVENTION

It is an objective of the present invention to provide a software monitor for a computer. The software monitor collects data for two different types of software: system software and parallel software. System software is any program running on a single processor; including a single processor within a multiprocessor system. Parallel software is software in which dynamic scheduling of code for execution on different processors occurs at runtime, such as an application program written in Simultaneous Pascal. The software program is segmentized into one or more segments (by the programmer) and the software monitor determines the software run time for each segment. The systems software monitor can also determine the number of times the segment was entered and the number of interrupts received by the processor during each segment. This information is stored in registers of the software monitor for later retrieval and analysis. Registers are also included for storing information representing the segment currently running on the processor, the time the current segment was entered, the number of nested interrupts received by the processor, and the processing time spent to accommodate interrupts. The software monitor includes a time base generator, a control module, and a plurality of storage registers. Optionally, data can be collected to provide a histogram of a selected segment while running system software. In the multiprocessor embodiment, the software monitor includes a number of segment register banks equal to the number of processors in the multiprocessor system. Each bank further includes a plurality of registers for collecting the software utilization information discussed above. The control module controls the flow of information into the registers and the time-base generator provides timing information for storage in the registers.

For parallel software the software monitor keeps track of the number of entries into a segment, the number of current segment instances, the total time in a segment, and the total work performed while in a segment. The software monitor collects data for these two different types of software, only one of which can be executed at a time.

BRIEF DESCRIPTION OF THE DRAWINGS

The present invention may be better understood, and the further advantages and uses thereof more readily apparent when considered in view of the following detailed description of exemplary embodiments, taken with the accompanying drawings in which.

DESCRIPTION OF THE PREFERRED EMBODIMENTS

The software monitor of the present invention monitors the behavior of software running on individual processors of a multiprocessor system or running on a uni-processor system. The software is conceptionally divided into a set of mutually exclusive, collectively exhaustive segments, and the software monitor collects utilization information for each of these segments. At any time the program is in one and only one of these segments. When the program passes into a new segment, it issues a single word message to the software monitor identifying the segment being entered. The software monitor keeps track of the amount of time the processor spends in each of the program's segments and the number of times each segment is entered. The software monitor is a slave device, and in one embodiment is located in a global address space that is accessible by all processors on a multiprocessor system. In one embodiment the software monitor can support monitoring of eight multiple processors at one time, with each processor's software code divided into 63 segments. As those skilled in the art will recognize, it is easy to replicate the features of the present invention to accommodate additional processors and software segments.

The utilization information about program segments provided by the software monitor is deterministic, rather than stochastic, as derived from the prior art profiling methods. The software monitor permits data to be collected in an almost non-intrusive manner, causing little perturbation to the behavior of the system. In one embodiment, the timing base is approximately a one microsecond clock permitting very fine measurements. Software segments as small as 20 microseconds can be measured with sufficient accuracy. Since determination of the segment boundaries is entirely a function of user defined software, the software monitor's capability are very flexible. The segments are defined by statements placed in the program, and the user may change the segment definition from one program run to the next run to reduce the number of statements in each segment and thereby narrow the source of a particular behavioral characteristic of the software.

Figure 1:
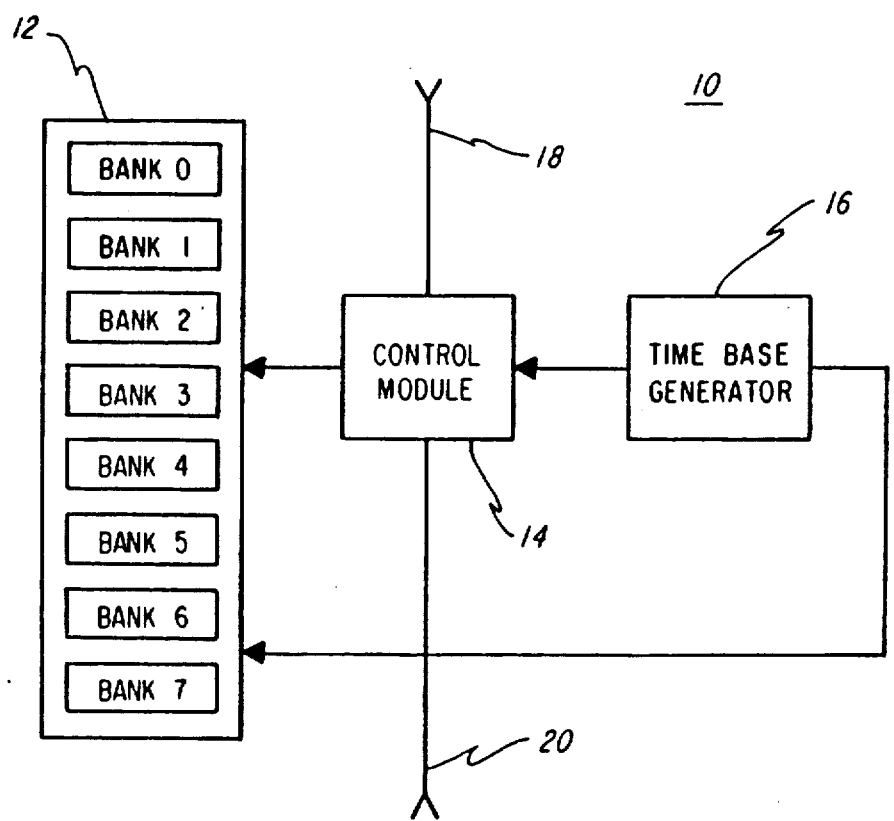
FIG. 1 is a simpled block diagram illustrating the structure of the present invention.

FIG. 1 is a block diagram of a software monitor 10 constructed according to the teachings of the present invention and adapted for multiple-processer use. Only the data paths are shown in FIG. 1. The software monitor 10 includes a segment register bank 12, a control module 14, and a time-base generator 16. External interface busses 18 and 20 are also shown in FIG. 1. Each bank within the segment register bank 12 is dedicated to a specific microprocessor of the multiprocessor system. The external interface bus 20 is connected between the control module 14 and a system bus of the multiprocessor system (not shown). Information concerning the currently operative program segments and changes thereto is provided on the external interface bus 20, and all the microprocessors connected to the system bus can read the contents of any register within the segment register bank 12, via the external interface bus 20. The external interface bus 18 is connected to the bus arbiter mechanism of the multiprocessor system to identify the processor controlling the system bus. It is necessary for the control module 14 to know which microprocessor is controlling the bus at all times so that the appropriate bank in the segment register bank 12 can be updated with the latest information. In another embodiment of the present invention it would be possible to provide a manual control signal to the control module 14 via the external interface bus 18 to identify the processor that is in control of the multiprocessor system bus.

The time-base generator 16 is a timer that counts clock cycles and provides this information to the segment register bank 12 for updating the various registers contained therein. The time-base generator 16 provides a unique reading for every clock cycle during running of the software. Commands indicating a change in the program segment for one of the processors are received by control module 14 from the external interface buses 18 and 20. In response, the control module 14 modifies the appropriate register in the segment register bank 12 according to the current value from the time-base generator 16.

Figure 2:
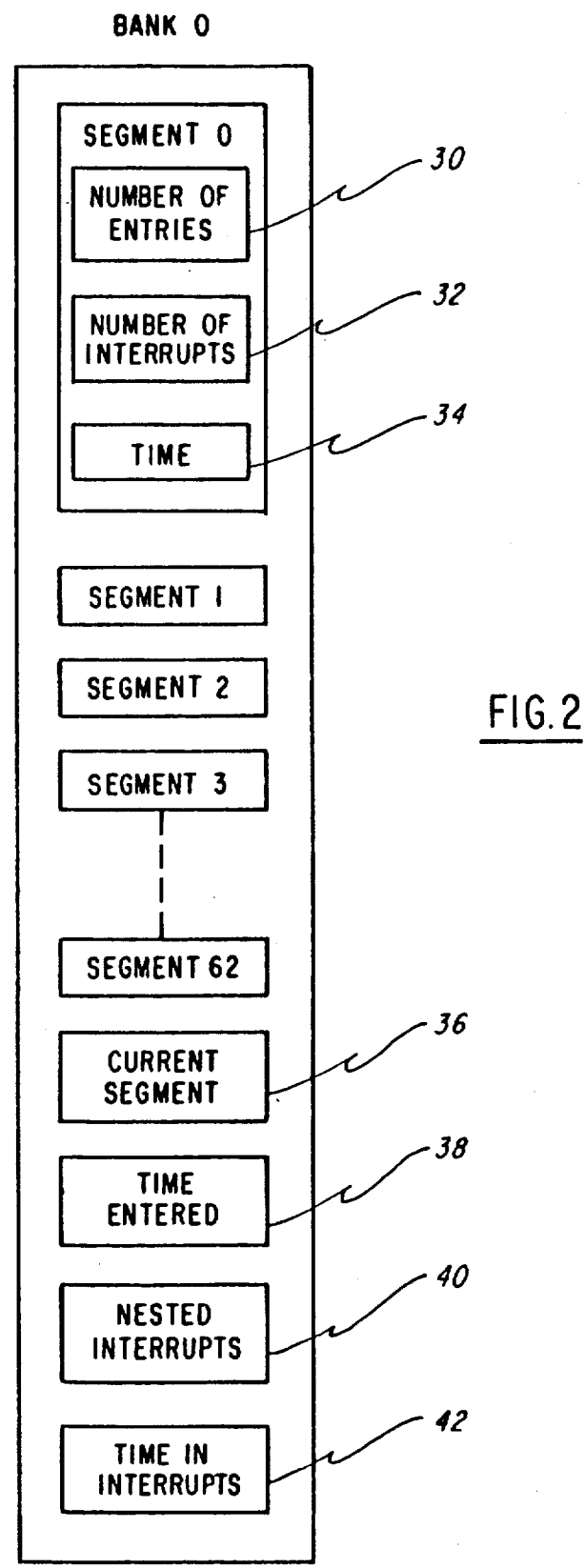
FIG. 2 is a detailed block diagram of one of the banks illustrated in FIG. 1.

Bank 0 of the segment register bank 12 is illustrated in more detail in FIG. 2. In one embodiment, each bank is divided into 63 segments, and each segment contains three registers as follows: a number-of-entries register (such as the number-of-entries register 30), a number-of-interrupts register (such as the number-of-interrupts register 32), and a time register (such as the time register 34). The number-of-entries register 30, indicates the number of times the segment was entered. The number-of-interrupts register 32 shows the number of times the processor was interrupted while in that program segment. The time register 34 shows the total time spent in the segment by the processor. Each of the additional segments 1 through 62 shown generally in FIG. 2 have registers identical to the three registers illustrated for segment 0.

Bank 0 of the segment register bank 12 also has four additional registers; the current-segment register 36, the time-entered register 38, the nested-interrupt register 40, and the time-in interrupts register 42. The current segment register 36 indicates the current program segment that is being executed. The time-entered register 38 shows the value of the time base at the time of the most recent segment change in the program. The nested interrupts register 40 indicates the depth of interrupts at the current time. The time-in interrupts register 42 indicates the value of the time base when the current segment was suspended due to an interrupt.

The processors of a multiprocessor system communicate with the software monitor 10 using a small number of commands that are reflected at the machine level by single word write instructions to the address locations of the various registers in the software monitor 10. A subset of the address space used by the processors of the multiprocessor system is occupied by some of the registers of the software monitor 10. Processor read operations to locations within this address subset are mapped isomorphically to internal register addresses of the software monitor 10, returning the value of the register contents to the processor. Write operations to the address subset are interpreted by the software monitor 10 as commands eliciting an internal program response consistent with the objective of the specific command.

The following commands take a single argument that indicates the segment to be modified for the particular processor sending the command. The commands are described with respect to the registers identified in FIG. 2 and the processor associated therewith but are applicable to all segment and bank registers. The CHANGE SEGMENT command, which requires a processor identification and a new segment number as arguments, (ChngSeg) adds the time elapsed since the last time update to the time register 34. This command also replaces the contents of the current segment register 36 (i.e. the old segment, for example segment 0) with the new segment that is the argument in the command (for example segment 1). Lastly, if the system is running, this command increments the number of entries register of the new segment to represent the number of times that the new segment has been entered.

The ENTER-INTERRUPT command (EnterInt) indicates that the processor has entered an interrupt routine, and adds the elapsed time since the last operation to the processor's time register for the current segment. Only the processor identification is required as an argument. For example, if the processor is operating in segment 0 this command adds the elapsed time to the value in the time register 34. This command also increments (or decrements in another embodiment) the nested interrupts register 40. Lastly, assuming the software is operating in segment 0, this command increments the number of interrupts register 32. Since it is desirable to monitor only the time the processor spends executing systems commands and not the time spent in interrupts, if an ENTER-INTERRUPT command is received while the processor is executing a lower level interrupt, no elapsed time registers are advanced.

The EXIT-INTERRUPT command (ExitInt) requires the processor identification as an argument to decrement the nested interrupts register 40 (or in another embodiment increments that register). If the value in the nested interrupts register 40 becomes zero, then this command also adds the elapsed time since the last operation to the time-in interrupts register 42.

The remaining commands are system-level commands that effect every processor's segment bank state as follows. The CLEAR-STATE command (ClearState) clears (i.e., zeros) all registers in the segment identified in the argument of the command for all processors. The ADJUST-PROCESSOR command (AdjustProcs) updates the count in the time register for the current segment of every processor. The INITIALIZE PROCESSOR command (InitProcs) clears the current segment register 36, the time entered register 38, the nested interrupts register 40, and the time-in interrupts register 42 for every bank and sets the system time-base generator 16 to zero. The START command (Start) starts the time-base generator 16. Lastly, the STOP (Stop) command stops the time-base generator 16 to inhibit increases in the time-base value.

Figure 3:
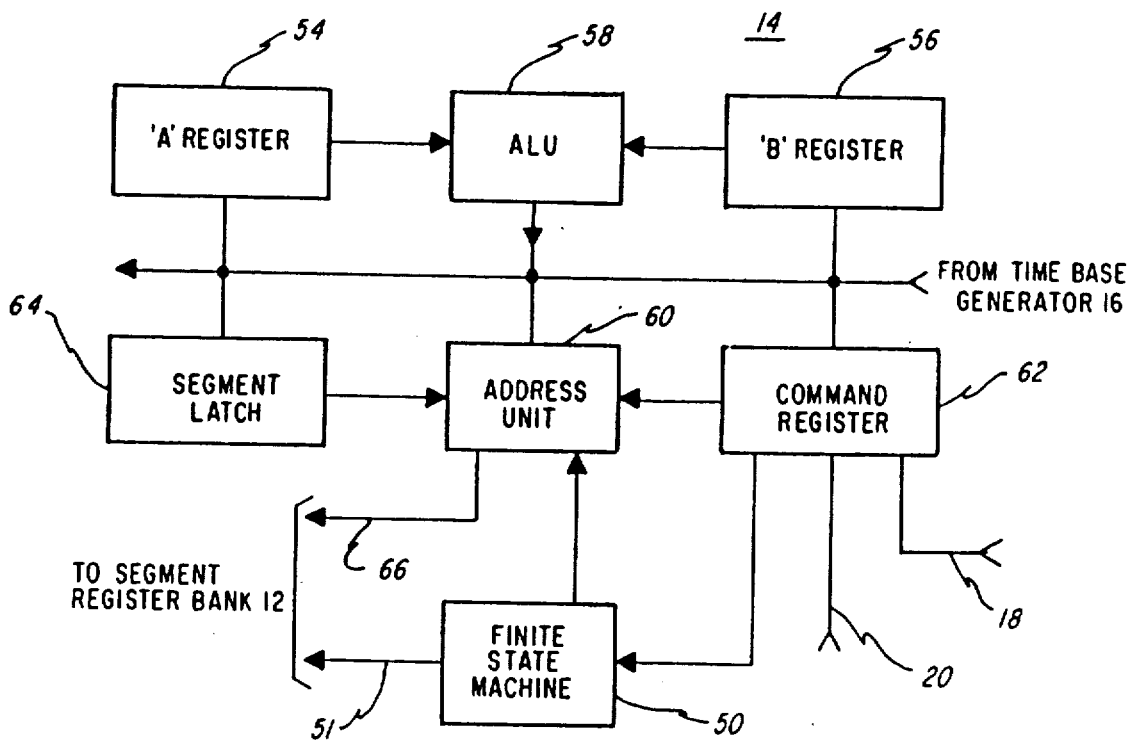
FIG. 3 is a block diagram of the control module illustrated in FIG. 1.

FIG. 3 is a detailed block diagram of the control module 14 shown in FIG. 1. The control module 14 manages all activities within the software monitor 10, including operations necessary to update the registers of the segment register bank 12 in response to commands from the external interface to the multiprocessor being monitored. The control module 14 comprises the following components. A finite state machine 50 sequences the operations of the software monitor 10 and generates all control signals within the control module 14. The control signals are provided on a conductive path 51 and input to the segment register bank 12. The conductive path 51 comprises one or more conductors. The registers within the segment register block 12 can be constructed of any storage devices as are well known by those skilled in the art. The control signals from the finite state machine 50 can enable the appropriate storage devices so that the storage devices can be incremented or decremented as necessary. As discussed above, the incrementation or decrementation is by a single unit or by elapsed time, depending on the applicable storage register. The control module 14 also includes a bus 52 connecting the several elements of the control module 14 to provide a data path therebetween.

An A register 54 and a B register 56 hold arithmetic values, that are provided as inputs to an arithmetic logic unit 58. The arithmetic result is placed on the bus 52. A command register 62 contains the most recent command from the external interface bus 20 and distributes the command's bit fields to an address unit 60, the finite state machine 50, and the bus 52. The segment latch 64 is a register for holding the number of the working segment, e.g., segment 0 of the bank 0. The conductor 66 from the address unit 60 provides an address signal to the segment register bank 12 so that the proper register within the segment register bank 12 is enabled for changing according to the data on the bus 52. When the command register 62 acquires a new command from the external interface bus 20, the finite state machine 20 interprets the command and initiates the proper sequence of actions.

Figure 6:
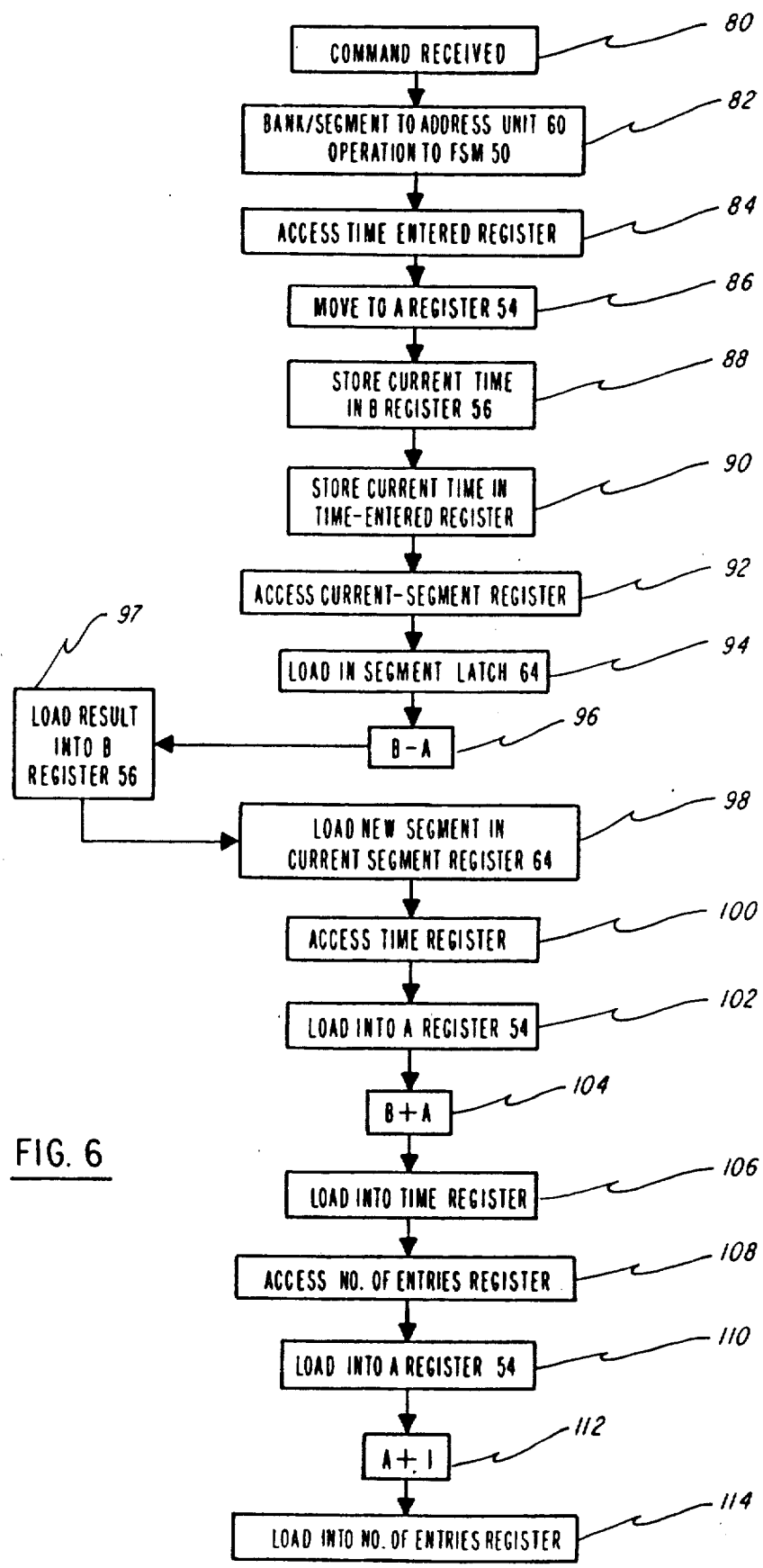
FIG. 6 is an illustrative software flowchart for one of the software commands of the present invention.

Operation of the control module 14 is illustrated in the following example demonstrating how the CHANGE-SEGMENT command is handled. See FIG. 6. Assume this change segment command advises the software monitor 10 that the microprocessor represented by bank 0 has discontinued processing in segment 0 and has changed to processing in segment 1. At a step 80, the command register 62 receives the CHANGE-SEGMENT command via the external interface bus 20. The signal on the external interface bus 18 to the command register 62 indicates the microprocessor that is the current bus master processor, and thus indicates the applicable register bank in this example, bank 0. The bank number (bank 0) is sent to the address unit 60 from the command register 62, and the operative portion of the command is sent to the finite state machine 50. This is illustrated at a step 82 of the FIG. 6 flowchart. At a step 84 the address unit 60 accesses the time-entered register, in this example the time-entered register 38 of bank 0 (see FIG. 2). The value in the timed-entered register 38 is moved to the A register 54 via the bus 52. This is indicated at a step 86. The current time from the time-base generator 16 is input to the B register 56 via the bus 52 at a step 88. At a step 90, the current time is stored in the time-entered register 38 of the bank 0 via the bus 52. At a step 92 the address unit 60 enables the current-segment register 36 (illustrated in FIG. 2) via the conductor 66. At a step 94 the value in the current-segment register 36 is loaded into the segment latch 64. At a step 96 the arithmetic logic unit (ALU) 58 computes the difference between the values in the A and B registers 54 and 56, respectively. The result represents the length of time of the most recent execution of the segment. The result is loaded into the B register 56 at a step 97. At a step 98 the new segment value, which is the argument of the CHANGE-SEGMENT command is loaded into the current segment register 64 from the command register 62. In this example the new segment value is segment 1. At a step 100 the address unit 60 accesses the time register 34 (shown in FIG. 2), and the value of this register is loaded into the A register 54 at a step 102. At a step 104 the A and B registers 54 and 56 are added; the result represents the total time spent in segment 0 up to the current time. The result is loaded into the time register 34 at a step 106. At a step 108 the address unit 60 accesses the number of entries register 30 (see FIG. 2). The value in the number of entries register 30 is loaded into the A register 54 at a step 110. At a step 112 one is added to the value in the A register 54. The sum is loaded into the number of entries register 30 at a step 114. This completes the operation of the software monitor 14 for the CHANGE-SEGMENT command. As can be seen by those skilled in art, other commands are performed in a similar fashion by accessing registers within the identified bank and performing the appropriate operation on the value contained therein.

The timing measurements provided by the software monitor 10 specify the amount of time spent in each program segment and the number of times each segment is entered. From this, the relative amount, or percentage, of time spent in a segment with respect to the total running time can be derived. The average amount of time spent during each excursion into a segment can also be determined. However, this information does not indicate whether every excursion into a segment took about the same amount of time or if the amount of time varied significantly from one excursion to the next. Another embodiment of the software monitor 14 can provide information about the variability of the segment excursions by determining the variance of the excursion times for each segment. This is done by augmenting the segment registers by adding a time-squared register for each time register (such as the time register 34 illustrated in FIG. 2). For every segment, the variance can be calculated from the time, time-squared, and number of entries registers. With this additional register, when a processor changes to a new segment of the program, the software monitor 10 increases the old segment's time register value by the amount of the recent excursion, and increases the old segments time-squared register value by the square of the amount of the recent excursion.

As can be seen by those skilled in the art, it is possible to develop other embodiments for the software monitor 10 by adding additional registers to the segment register bank 12 to collect data related to various operational parameters of the system. Using such additional registers, it is possible to create, for example, a histogram of the number of times a segment of interest is run for a given duration. The registers providing this data can be adjusted to adjust the base of the histogram, which is the lowest duration of the segment that will be included in the histogram data, the number of entries and total time spent below the base value, the number of entries and total time spent above the base value, and the time the current segment entry began. Because information related to the actual time spent in each segment is desired, the accumulation of time in the appropriate registers is deferred during interrupts.

Figure 4:
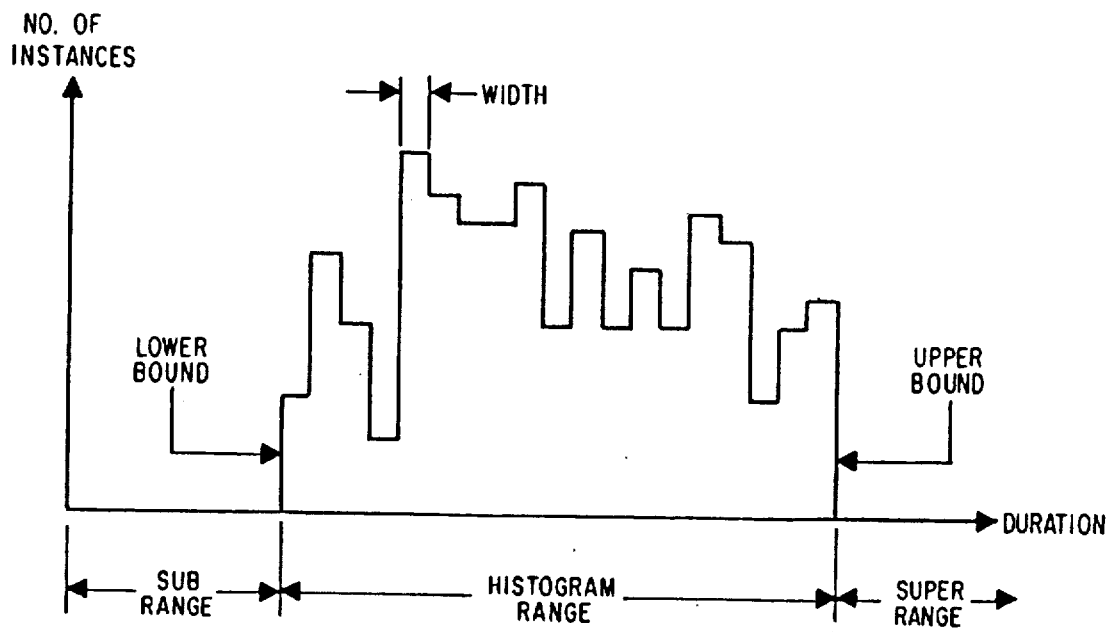
FIG. 4 is an illustrative histogram produced by an embodiment of the present invention.
Figure 5:
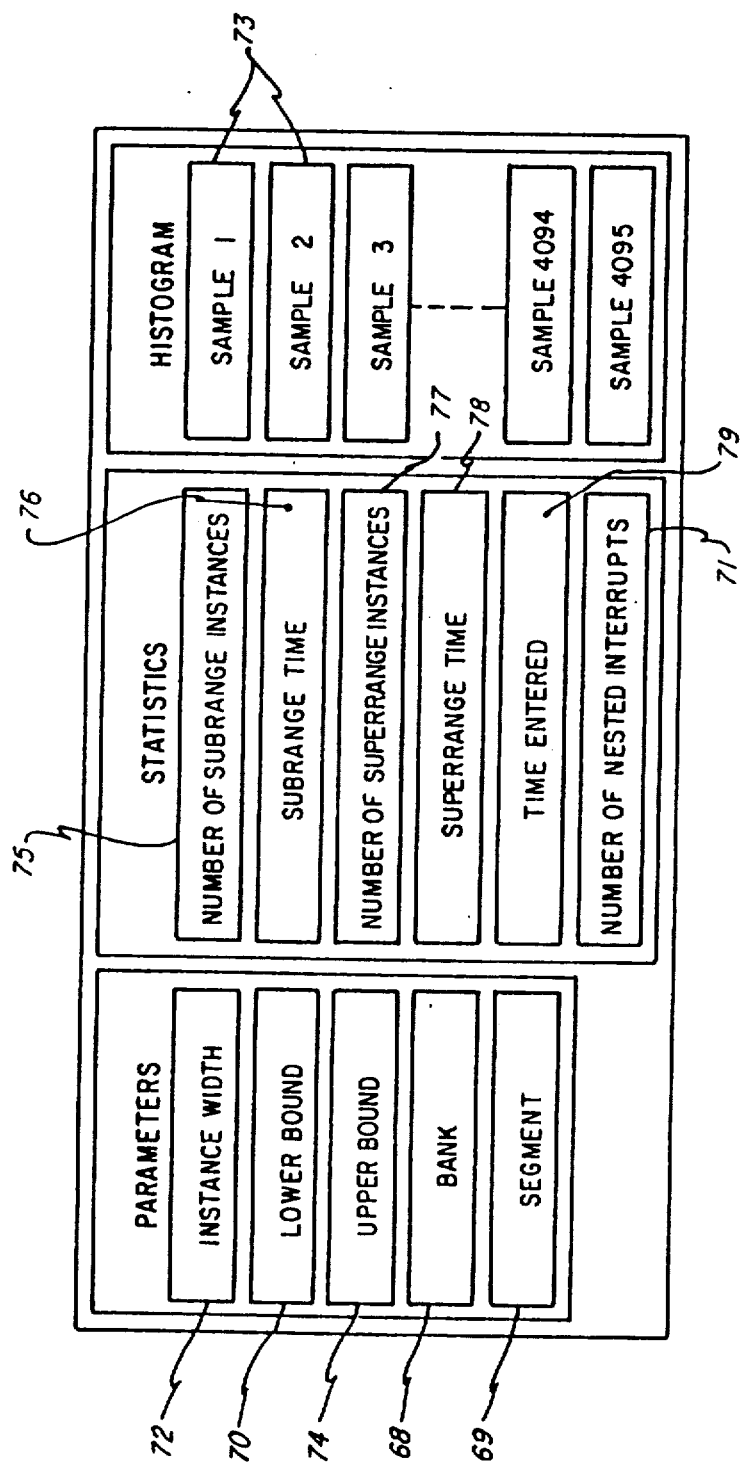
FIG. 5 is a block diagram of registers associated with the embodiment of FIG. 4.

An illustrative histogram prepared by the software monitor 10 is illustrated in FIG. 4. There is a specific histogram operational mode for the software monitor 10, in which data is collected for only a specified processor and segment. To construct the histogram a special set of registers, as shown in FIG. 5, is required. The bank register 68 and the segment register 69 indicate the processor and segment for which histogram data is being collected. The lower bound register 70 indicates the time at which the histogram data collection starts. The number of nested interrupts register 71 contains the interrupt depth at any given time. The instance-width parameter register 72 contains the number of system time-base clock cycles that each sample register, shown generally by reference character 73, covers. The upper-bound register 74 indicates the time at which histogram data collection stops. In the embodiment shown in FIG. 5 there are 4095 sample registers, indicated generally with reference character 73. The relationship between the upper-bound register 74, the lower-bound register 70, and the instance width register 72 is such that the difference between the contents of the upper-bound register 74 and the contents of the lower-bound register 70 divided by the contents of the instance-width register 72 is 4095. The various statistics registers illustrated in FIG. 5 are required to provide all necessary information for a complete histogram. The number of subrange instances register 75 contains the number of times a timing sample falls below the lower bound register value. The subrange time register 76 accumulates the total time that the subrange instances took place. Similarly, the number of superrange instances register 77 contains the number of times the timing sample falls above the upper-bound register value. A superrange time register 78 accumulates the total time that the superrange instances took. A time-entered register 79 serves the same purpose as does the time-entered register 38 shown in FIG. 2. The 4095 sample registers 73 contain the number of times a segment execution took exactly the number of system time base clock times associated with that register.

To support the histogram mode for the software monitor 10, several additional commands are required to initialize the parameter registers illustrated in FIG. 5. A SET-SEGMENT command sets the bank register 68 and the segment register 69 to the processor number and segment numbers specified in the argument of the command. The SET-LOWER-BOUND command sets the lower-bound parameter register 70 to the value specified in its argument.

The SET-SAMPLE-WIDTH command includes an argument that is an encoded power of two and is stored in the instance-width register 72. By an encoded power of two argument it is meant that an argument of zero sets the instance-width the register 72 to one system time base tick (or clock), an argument of one sets the width to two ticks, an argument of two sets the width to four ticks, an argument of three sets the width to eight ticks, and so forth. This command also calculates and stores the upper bound parameter value based upon the instances-width and the lower-bound parameter register values. Therefore, this command must be executed after the SET-LOWER-BOUND command.

When collecting histogram data, the CHANGE-SEGMENT command discussed above behaves somewhat differently. If a previous CHANGE-SEGMENT command made a match on the segment for which histogram data is being collected (of course this must also be the correct processor), then the elapsed time since the previous CHANGE-SEGMENT command must be calculated and compared to the contents of the upper-bound and lower-bound registers 74 and 70 respectively. If the elapsed time falls above or below these bounds in the proper instances register (either the number of subrange instances register 75 or the number of super-range instances register 77) must be incremented and the elapse time must be added to the proper time register (either the subrange time register 76 or the superrange time register 78). If the elapsed time falls between the two bounds, the location of the sample register (one of the sample registers identified by reference character 73) associated with this time must be determined and its value incremented. An application program running on a multiprocessor differs in two ways from the system software. With an application program on the multiprocessor, more than one processor participates in the execution of the application program at the same time. Thus, a bank of registers dedicated to a single processor is inadequate for capturing the behavior of an application program running on a multi-processor. Secondly, it is not easy to divide a parallel program such that it will be in only one segment at a time. The segments may overlap in execution because of the unordered concurrent execution nature of the statements in parallel programs. For a systems software that is sequential and statically scheduled (such as for a uniprocessor) when interrupts are accounted for, exact and repeatable timing information can be obtained by a software monitor. However, for parallel executing programs, processing resources are available in a time-shared and random manner such that each piece of the program exhibits varying start to stop times from run to run. Thus the data obtained for parallel program execution is more of a stastical nature.

The software monitor of the present invention can also monitor the behavior of individual processors of a mulitprocessor system. Examples of such multiprocessor systems are given below. In these examples each of the processors operates as a central processing unit, having its own local memory as well as a global memory accessible by each of the processors. Each of the processors execute both system software involving only each individual processor and its memory, and application software that runs on all of the multiprocessors. As applied to the parallel processing architecture, one embodiment of the present invention monitors only the system software. This embodiment of the present invention is identical to that described above in conjunction with the uniprocessor architecture. Another embodiment of the present invention monitors application software, which is that software that executes on one or more of the processors at any given time (and may execute on more than one processor simultaneously) and includes accesses to the global memory. This embodiment will also be discussed in detail below.

Figure 9:
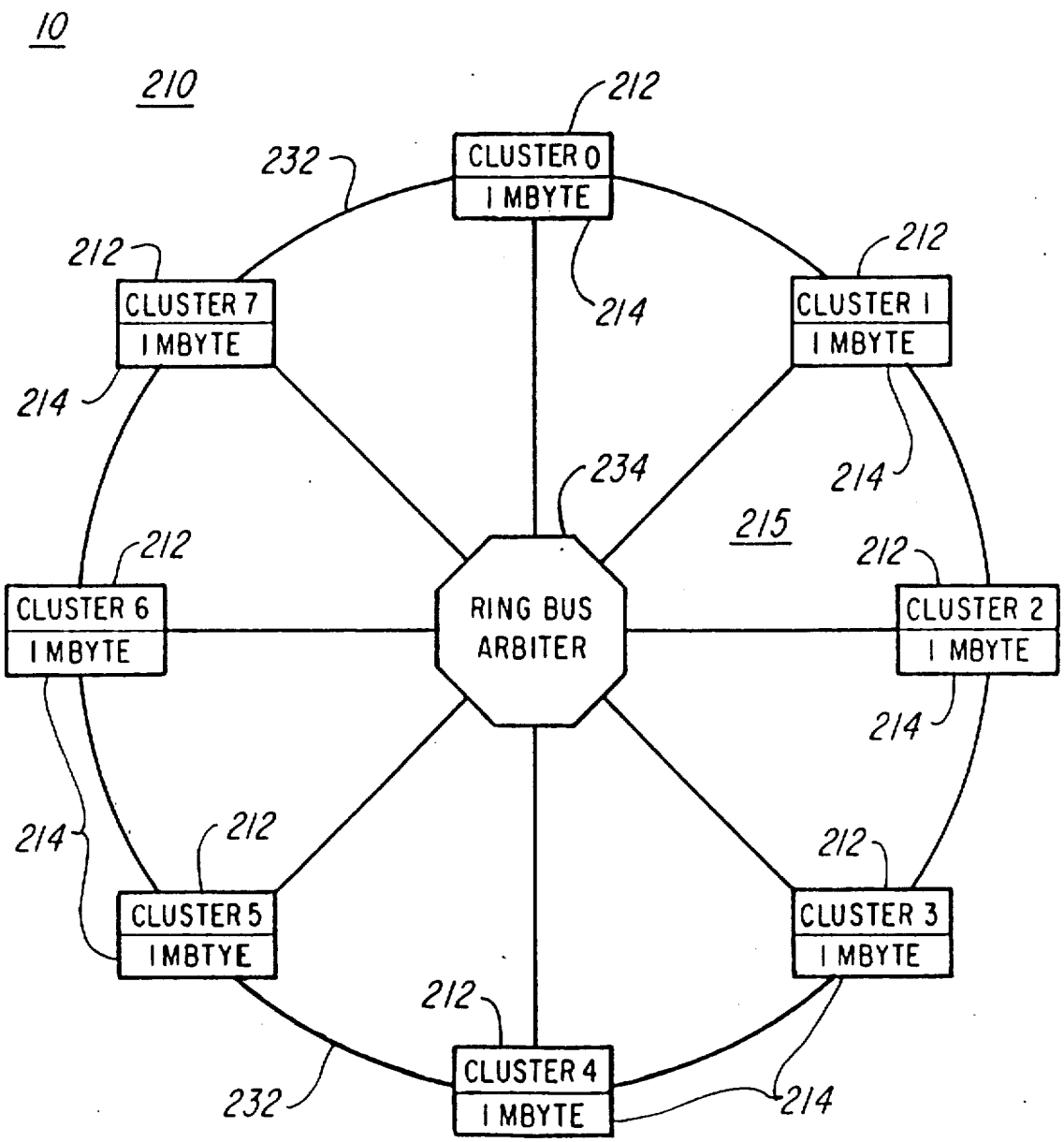
FIGS. 9 and 10 illustrate the present invention in a multiprocessor system environment.

FIG. 9 shows a multiprocessor system 210 comprising a plurality of clusters 212, with each cluster 212 including a memory module 214. In the FIG. 9 embodiment there are eight clusters designated cluster 0 through cluster 7. The eight memory modules 214 together constitute a global memory. 215. In FIG. 9 the memory modules 214 are shown as 1 megabyte, but those skilled in the art will realize that any memory size can be used. Each cluster 212 includes eight microprocessors (not shown in FIG. 9) for a total of 64 microprocessors in the multiprocessor system 210.

Figure 10:
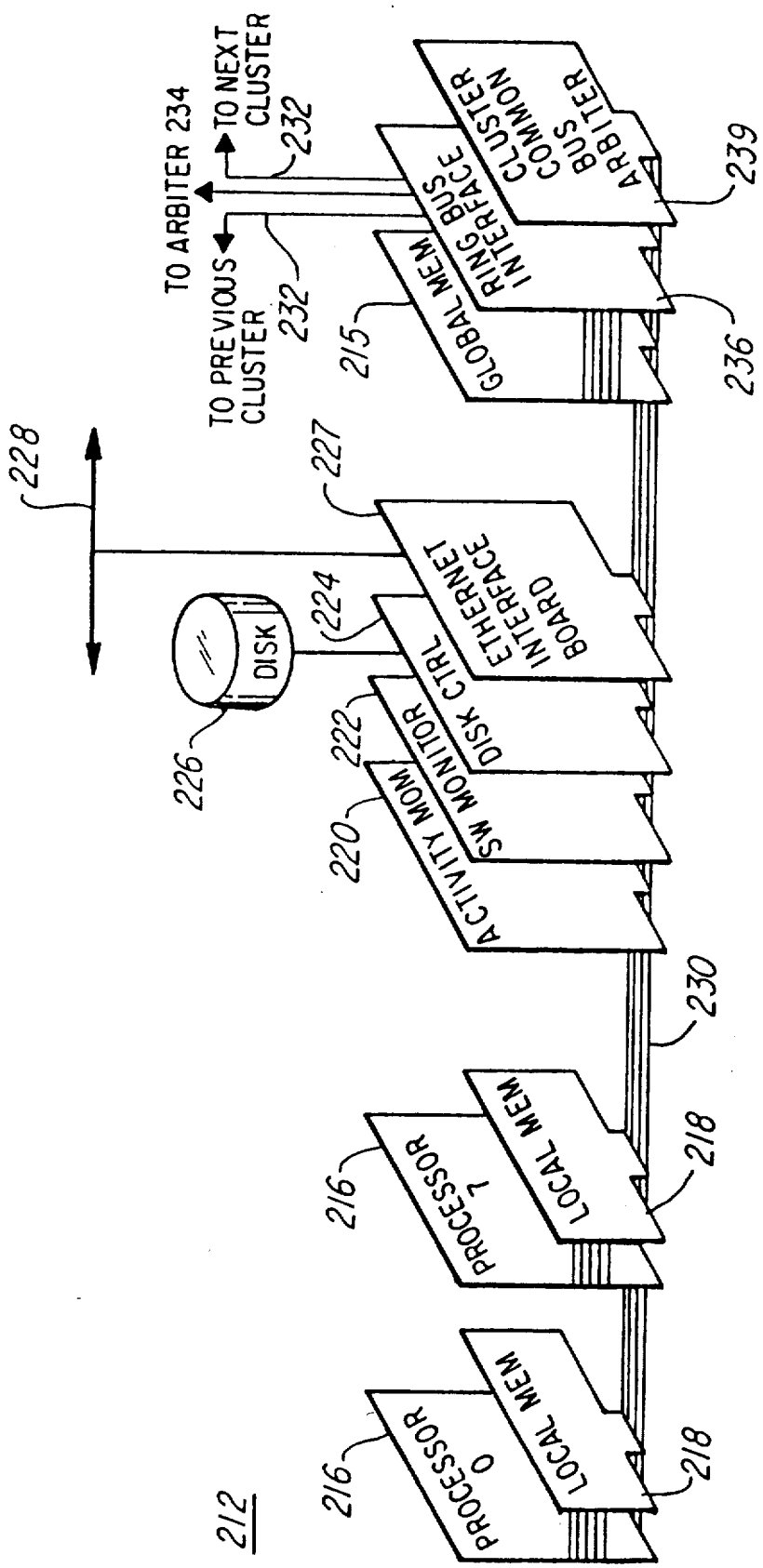

A single cluster 212 is illustrated in FIG. 10. Each cluster 212 includes eight microprocessors 216 (designated as processor 0 through 7 in FIG. 10) each coupled to a local memory unit 218. The cluster 212 also includes an activity monitor 20, which is described and claimed in copending and commonly owned United States patent application entitled Method and Apparatus for Monitoring Activity of a Mulitprocessor, U.S. Ser. No. 07/243,526 filed on Sept. 9, 1988. A software monitor 222, described and claimed herein is also shown in FIG. 10. The cluster 212 also includes a disk controller 224 and a disk 226. Communications to the outside environment is provided via an Ethernet interface board 227 and an Ethernet communications link 228. (Ethernet is a trademark of the Xerox Corporation.) The memory module 214 is also illustrated in FIG. 10. A processor 216 accessing a memory module 214 within its cluster uses a cluster common bus 230, while memory modules 214 in other cluster are accessed via a ring bus 232 illustrated in FIG. 1. In one embodiment, the internal bus 230 is a bus defined by the Institute of Electrical and Electronic Engineers (IEEE) standard 796. A ring bus arbiter 234 (see FIG. 1) processes a request for access to the ring bus from the clusters 212 and establishes non-overlapping paths between the requesting cluster and the desired memory module 214 of the global memory 215. Each cluster 212 is attached to the ring bus 232 via a ring bus interface board 236 that is illustrated in FIG. 10. The cluster common bus 230 provides the medium for all intra-cluster communications. A cluster common bus arbiter 239 processes requests for access to the cluster common bus 230 and establishes appropriate non-overlapping paths for communications between the requesting processors 216 and the target.

As previously described, "system software" is confined to a single processor in the multiprocessor environment and involves only that processor and its memory. In the context of the present invention, system software comprises segments of contiguous code, which upon entry by a particular processor of a multiprocessor system, executes to completion on that processor (with the possible exception of servicing interrupts for which no measurements are performed by the software monitor of this invention). In this embodiment the software monitor accumulates the execution time for each code segment on a per processor basis.

Unlike system code that is dedicated and runs on a specific processor, "parallel or application software" is used for applications to which multiple processors have been applied together to reduce the execution time of the code. For parallel software, the idea of a segment as related to the present invention has been generalized to include code that migrates among multiple processors during execution. A segment of parallel software code, once entered, may be performed completely by the initiating processor, migrate from one processor to another, be performed by multiple processors at a particular moment, or may have no processor dedicated to its execution at a particular moment. Furthermore, a segment of parallel software code may have zero, one, or multiple instantiations active at any one time. Therefore in the parallel software mode the software monitor 10 monitors the status of each segment, not on a per processor basis but across the entire multiple processor system.

A parallel software segment may be as simple as a systems software segment in that it is a single thread of contiguous code, or it may be a collection of separate but related threads of contiguous code. In this latter case some of these threads may be performed concurrently while others must wait for previous ones before they themselves can be executed. In either case, the software monitor keeps only one record of the segment rather than a separate record of the segment for each processor.

There are two kinds of measurements that can be made by the software monitor for application of parallel software segments: entry-exit time and work time. Entry-exit time is the time between when a new instantiation on the segment is initiated and when it is terminated. This is a wall clock measurement in that it reflects the difference between the readings of the wall clock when the segment is exited and when it is entered. Work time is a measurement of the amount of processor time spent in performing the potentially multiple threads of the segment. For work time measurements no time accrues when there are no processors actively performing tasks associated with an instantiated segment. However, even if no processors are actively performing tasks of a given segment, the entry-exit time of the segment does accrue.

A critical parameter maintained by the software monitor for each segment of parallel software is the number of active instantiations. The purpose of this parameter is to determine the time-cost attributed to a segment for each time step. For entry-exit time measurements, the number of active instantiations refers to the number of entry events for a segment minus the number of exit events for that segment. If the number of entry and exit events is the same, then there are no active instances of the segment and no time cost is accorded the segment. If there is just one active instance of the segment, then there has been one more entry event than exit events and the time-cost increases by one for each system time step. If there are multiple active instances, say n, then there have been n more entry segments than exit events experienced for that segment. In this case, a cost of n accrues for that segment during each system time step.

For work-time measurements a different parameter, say m, is maintained indicating the total number of independent instances of threads of code within the segment that are active at any time. The parameter may include active threads of different instances of the segment. For each time step, a work cost of m accrues for that segment. A segment may be active even if m is zero because there are more threads of code to be performed within the segment but no processor is currently allocated to performing them. During these occasions no work time costs are accrued for that segment.

The software monitor monitors the status of the parallel software by responding to event messages or markers that are inserted in the code by the user or automatically by the compiler. These markers, which are essentially program statements, are discussed further below. For entry-exit time measurements, these markers are identified by the software monitor at the beginning and at the end of each segment. For work-time measurements, event messages are sent at the beginning and end of each executing thread within a given segment as well as at the beginning of the segment itself. The only reason for the segment entry message during work-time measurements is to keep track of the number of times a particular segment was performed so that a work-time average statistic can be calculated.

Thus in a parallel or multiprocessor computer system the system software, which is dedicated and runs only a specific processor, is monitored by the software monitor 10 as discussed above. An application program or parallel software in the multiprocessor system requires a different embodiment of the present invention, as discussed in more detail below.

Figure 7:
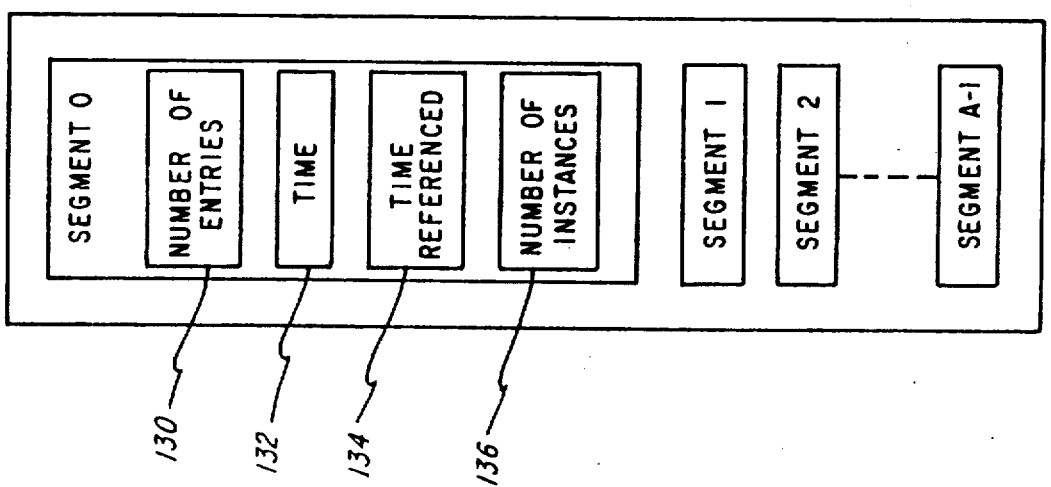
FIG. 7 is a block diagram of a segment bank for another embodiment of the present invention.

Parallel application program monitoring is supported by another embodiment of the software monitor 10, by dedicating a bank of segment registers to the application program. No division of the segment registers into separate banks for each processor is required since all processors have the capability of executing the same code segments. All processors refer to these registers via special commands dedicated to this mode of operation. One embodiment of the software monitor 10 that supports parallel program monitoring is referred to as the entry-exit time mode. This embodiment has segments, each having four registers, as shown in FIG. 7. The number of segment entries register 130 indicates the number of times that the related segment of the application program was entered. The time register 132 specifies the total amount of time spent in task execution of the program segment. If tasks in the segment were executed more than once, the time register 132 contains the sum of the time spent in separate invocations of the tasks. Overlapping (in time) invocations of the same tasks are counted separately and produce the same value in the time register 132 as if they were non-overlapping. The time referenced register 134 contains the value of the time base when the segment was last referenced. The number of instances register 136 indicates the number of concurrent invocations of the tasks that are currently active.

The commands used with this entry-exit time embodiment of the software monitor 10 are as follows. The ENTER-SEGMENT command, which requires the segment number as an argument, increments the number of entries register 130 for the new segment and sets the time referenced register 134 to the current value of the time base.

Once it has been incremented, the number of entries register 130 shows the number of processor instantiations into the identified segment. After the time referenced register 134 has been set to the current time, the difference between this current time base value and the previous value in the time referenced register 134 is calculated. This number indicates the amount of time spent in that segment by the number of processors indicated by the contents of the number of instances register 136. For example, if the contents of the number of instances register 136 is four when the ENTER SEGMENT command is received, that indicates that four processors have been processing within the segment since the last update of the time referenced register 134. The time difference, multiplied by the value in the number of instances register 136 indicates cumulative overlapping time spent by the processors in the identified segment. For example, assume four processors were processing in the identified segment when the ENTER-SEGMENT command was received. The time difference calculation determines how long four processors were processing in the segment by simply subtracting the value of the current time when the ENTER-SEGMENT command was received and the last time value stored in the time referenced register 134. Multiplying that difference value by four produces a processor-time product. After the product has been calculated the number of instances register 136 is incremented to now show that one additional processor is processing in the identified segment.

Now, when one of the processors drops out of the identified segment an EXIT-SEGMENT command (which also requires a segment number as an argument) increases the value in the time register 132 by an amount equal to the product of the contents of the number instances register 136 and the difference between the current time base and the contents of the time-referenced register 134. Again, this calculation produces a processor-time product value. The contents of the number of instances register 136 is decremented and then the time referenced register 134 is set to the current value of the time base.

To use this embodiment of the software monitor 10 a segment is assigned to each procedure in the application program. The entry point of each procedure is provided with an ENTER-SEGMENT command and every return point of each procedure is provided with an EXIT-SEGMENT command. The statistics collected by this embodiment of the software monitor 10 show the number of times that each procedure was called during the course of the application program execution and the amount of execution time spent in each procedure.

The parallel work time mode, to be discussed in conjunction with FIG. 8, differs from the parallel entry-exit time mode discussed above in that the former accumulates the total amount of time spent executing certain tasks within a segment, whereas the later accumulates the total amount of time spent within a segment whether or not a task is actually being performed. The work performed by these tasks may vary greatly in nature, but all are associated with a specified segment.

In the work-time mode each of the segments is segregated into one or more tasks (also referred to as threads of code) and the time that processors spend executing these tasks is accumulated. This task segmentation is done by the programmer prior to execution, by placing the START-TASK and STOP-TASK commands discussed below. In another embodiment, the programmer can simply identify the tasks to be segmented and leave it to the compiler to actually insert the marker commands. Basically, the task segmentation offers the programmer/experimenter a finer grained look at the software execution by the microprocessors of the parallel processing system. In the parallel entry-exit time mode discussed above the software monitor of the present invention records the actual total number of clock ticks from the time when a processor enters a segment until it exits that segment, whether or not it was actually operating in that segment during the entire interval, i.e., the processor could have moved to another segment for execution, and later return to the segment of interest. This entire interval would be reflected in the entry-exit time mode data. By comparison, the work time or work mode accumulates the number of clock ticks only when a processor is operating within an identified task of an identified segment.

Figure 8:
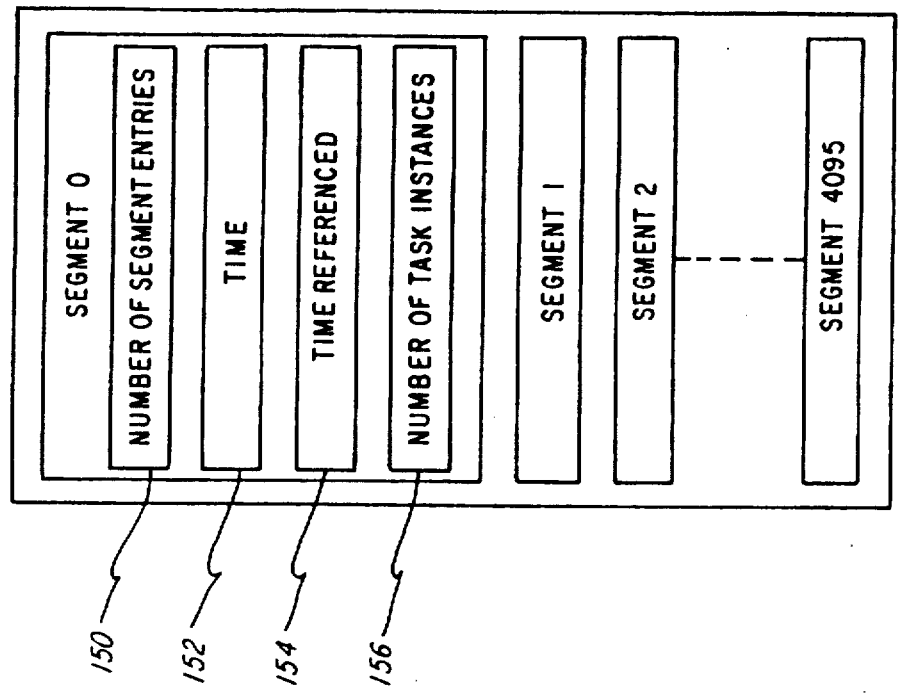
FIG. 8 is a block diagram of a segment bank for yet another embodiment of the present invention.

In the parallel work mode, the software monitor 10 requires segment registers as illustrated in FIG. 8. There is no division of the segment registers into separate banks for each processor since all processors have the capability of executing the same code segments. The number of segment entries register 150 contains the number of times a segment was entered. The time register 152 accumulates the total time spent in task execution. The time referenced register 154 contains the value of the time base when a task was last referenced. The number of task instances register 156 contains the number of concurrent invocations of tasks within the segment at any one time.

Three commands are required for data collection during the parallel work mode. The first command is an ENTER-SEGMENT command that requires a segment value as an argument. This command functions to increment the number of segment entries register 150. The START-TASK command also requires a segment number as an argument. With this command, the difference between the present time base value and the contents of the time referenced register 154 is calculated. The difference is multiplied by the value contained in the number of tasks instances register 156 and the product added to the value in the time register 152. Also, the present time base value is stored in the time referenced register 154 and the number of task instances register 156 is incremented. The STOP TASK command also requires the segment number as an argument. The difference between the present time base value and the value contained in the time referenced register 154 is calculated and multiplied by the value in the number of tasks instances register 156. The product is added to the value in the time register 152. Also, the number in the task instances register 156 is decremented and the present timebase value is stored in the time referenced register 154.

Having described the software monitor 10 and the various embodiments thereof, it can now be seen that the software monitor 10 is useful in analyzing the efficiency of various system and application programs in a uni-processor or most especially in a multi-processor architecture. After analyzing the information collected, the software program can be modified to reduce any inefficiencies found therein.

While we have shown and described several embodiments in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are obvious to one of ordinary skill in the art.

What is claimed is:

1. A software monitor for monitoring the execution of software on a parallel multiprocessor computer system, wherein each processor operates as a central processor, and wherein the software running on at least one processor is segregated into a plurality of mutually exclusive segments by a user before execution, and wherein marker statements are inserted into the software to delimit the segments, and wherein the computer system executes the software, including the marker statements, said software monitor comprising:
   time-base generator means for providing clock pulses, wherein each clock pulse is representative of a predetermined unit of time;
   controller means responsive to the marker statements;
   a number of storage banks equal to the number of processors in the computer system;
   wherein each storage bank is subdivided into a predetermined number of segment sub-banks, wherein said predetermined number is equal to or greater than the number of segments;
   wherein each segment sub-bank is further subdivided into a plurality of storage locations;
   wherein one of said plurality of storage locations stores a value representing the time the respective processor spends executing the identified segment;
   wherein said controller means detects a marker statement designating the beginning of an identified segment;
   wherein said controller means detects a marker statement identifying the end of said identified segment;
   wherein the contents of the respective storage location is updated in response to the number of clock pulses occurring during execution of the identified segment.

2. The software monitor of claim 1 wherein one of the plurality of storage locations stores a value representing the number of times the identified segment was entered during execution of the software;
   and, wherein the controller means updates the contents of said storage location each time the identified segment is entered.

3. The software monitor of claim 1 wherein one of the plurality of storage locations stores a value representing the number of times an interrupt occurred while executing in the identified segment;
   and, wherein the controller means updates the contents of said storage location in response to each interrupt that occurs while executing in the identified segment.

4. The software monitor of claim 1 wherein each storage bank includes a current segment storage location;

wherein the controller means, in response to the marker statements, identifies the segment currently executing;

and, wherein the contents of the said current segment storage location is controlled by the controller means to identify the segment currently executing.

5. The software monitor of claim 1 wherein each storage bank includes a time-entered storage location; wherein the controller means is responsive to marker statements for designating the beginning of an identified segment;

wherein the time-base generator means produces a timing signal that is loaded into said time-entered storage location at the beginning of the identified segment.

6. The software monitor of claim 1 wherein the controller means is responsive to marker statements identifying interrupts in the execution of the software by the computer system;

wherein each storage bank includes a nested-interrupt storage location;

and, wherein the contents of said nested-interrupt storage location is modified by the controller means in response to the occurrence of each interrupt, to represent the number of nested-interrupts for the processor associated with the storage bank.

7. The software monitor of claim 6 wherein each storage bank includes a time-in-interrupts storage location;

and wherein the contents of said time-in-interrupts storage location is modified by the controller means, in response to the clock pulses to represent the amount of time the processor associated with that storage bank spent processing interrupts.

8. A software monitor for monitoring the execution of software on a parallel multiprocessor computer system, wherein each processor operates as a central processor, and wherein marker statements designating the beginning and the end of an interrupt are inserted into the software, and wherein the computer system executes the software including the marker statements, said software monitor comprising:

time-base generator means for providing clock pulses, wherein each clock pulse is representative of a predetermined unit of time;

controller means responsive to the marker statements;

a number of storage banks equal to the number of processors in the computer system;

wherein each storage bank includes a time-in-interrupts storage location for storing a value representing the time the respective processor spends processing interrupts;

wherein said controller means detects a marker statement designating the beginning of an interrupt;

wherein said controller means detects a marker statement identifying the end of an interrupt;

wherein the contents of the said time-in-interrupts storage location is updated in response to the number of clock pulses occurring during execution of the interrupt.

9. The software monitor of claim 8 wherein each storage bank includes a nested-interrupted storage location for storing a value representing the depth of the nested-interrupts currently being executed by the respective processor;

and, wherein the controller means is responsive to a marker statement identifying the beginning or the end of an interrupt;

and, wherein in response thereto the controller means modifies the contents of said nested-interrupts storage location.

10. The software monitor of claim 8 wherein the software running on at least one processor is segregated into a plurality of mutually exclusive segments by a user before execution, and wherein marker statements are inserted into the software to delimit the segments, and wherein the software monitor includes:

a number of storage banks equal to the number of processors in the computer system;

wherein each storage bank is subdivided into a predetermined number of segment sub-banks, wherein said predetermined number is equal to or greater than the number of segments;

wherein each segment sub-bank is further subdivided into a plurality of locations;

wherein one of said plurality of storage locations stores a value representing the number of interrupts processed by the respective processor during the identified segment;

wherein in response to a marker statement identifying the beginning or the end of an interrupt, the controller means updates the contents of the number of interrupts storage location in response thereto.

11. A software monitor for monitoring the execution of software on a parallel multiprocessor computer system, wherein each processor operates as a central processor, and wherein the parallel software may execute concurrently on more than one processor, and wherein the software is segregated into a plurality of mutually exclusive segments by a user before execution, and wherein marker statements are inserted into the software to delimit the segments, and wherein the computer system executes the parallel software, including the marker statements, said software monitor comprising:

time-base generator means for providing clock pulses, wherein each clock pulse is representative of a predetermined unit of time;

controller means responsive to the marker statements;

a number of segment storage banks equal to or greater than the number of segments, wherein each segment bank includes storage means for storing a value representing the time each processor spends processing interrupts;

wherein each segment storage bank is further subdivided into a plurality of storage locations;

wherein one of said plurality of storage locations stores a value representing the time spent executing the identified segment;

wherein said controller means detects a marker statement designating the beginning of an identified segment;

wherein said controller means detects a marker statement identifying the end of said identified segment;

wherein the contents of the respective storage location is updated in response to the number of clock pulses occurring during execution of the identified segment.

12. The software monitor of claim 11 wherein one of the plurality of storage locations stores a value representing the number of times the identified segment was entered during the execution of the parallel software, and wherein the controller means updates the contents of such storage location each time the identified segment is entered.

13. The software monitor of claim 11 wherein one of the plurality of storage locations stores a value representing the time at which the identified segment was entered, and wherein the controller means updates the contents of such storage location, in response to the clock pulses, each time the identified segment is entered.

14. The software monitor of claim 11 wherein one of the plurality of storage locations stores a value representing the number of concurrent invocations of the identified segment, and wherein the controller means updates the contents of said storage location in response to each entry into the identified segment.

15. The software monitor of claim 11 including means responsive to the controller means for determining the cumulative processor-time product for the identified segment, wherein the cumulative processor-time product represents the product of n, where n is the number of processor instantiations in the identified segment, and t, wherein t is the time during which there were n instantiations in the identified segment.

* * * * *